Feb. 11, 1969   S. A. CORREN ET AL   3,426,682
EXPLODING FUSE
Filed April 27, 1967

INVENTORS.
MYRON A. COLER
SIDNEY A. CORREN

BY Leonard H. King
ATTORNEY

INVENTORS.
SIDNEY A. CORREN
MYRON A. COLER

BY Leonard H. King
ATTORNEY

INVENTORS
SIDNEY A. CORREN
BY MYRON A. COLER

Leonard H. King
ATTORNEY

United States Patent Office 3,426,682
Patented Feb. 11, 1969

3,426,682
EXPLODING FUSE
Sidney A. Corren, 163 Cherry St., Katonah, N.Y.
10536, and Myron A. Coler, 56 Secor Road,
Scarsdale, N.Y. 10583
Continuation-in-part of application Ser. No. 463,441,
May 19, 1965. This application Apr. 27, 1967, Ser.
No. 642,993
U.S. Cl. 102—28   8 Claims
Int. Cl. F42b 37/00; C06c 5/00, 5/04

ABSTRACT OF THE DISCLOSURE

An electrical initiator employing a conductive plastic heating element to ignite a heat-sensitive explosive composition is disclosed. The conductive plastic element is supported by an insulator plastic base.

---

This application is a continuation-in-part of our co-pending application Ser. No. 463,441, filed May 19, 1965, and now abandoned.

This invention relates to electroexplosive devices, and, in particular, to electrical initiators employed in such devices.

Among the aspects of this invention are included improvements in electrical initiators which are less susceptible to premature firing by stray currents induced by radio-frequency fields and like sources of energy, and improved production methods, improved firing rate of the initiators and reduced firing energy requirement.

The usual electroexplosive device consists of a plug member adapted to mate with a receptacle in a mechanism to be explosively actuated. The plug is provided with electrical terminals adapted to be connected to an electrical energizing circuit. Within the plug there is an electrical initiator such as a resistance element which upon energization with sufficient power, is heated to the ignition point of a heat-sensitive explosive composition packed against the resistance element. In turn the heat sensitive explosive composition will detonate a base charge of a less sensitive explosive charge packed within the plug. The detonation of the explosive charge will in turn actuate a mechanism or detonate a high explosive.

The growth in the use of electroexplosive devices in weapons systems and the concurrent growth in the number and power output of radar communication and other radio frequency systems makes urgent that means be provided for preventing inadvertent firing or degradation of the electroexplosive devices. Electroexplosive devices are used in hundreds of components in missile, ordinance and space vehicles. Examples are explosive bolts, rocket motor igniters, rocket stage separator devices, missile destruct units, squib switches, squib valves, smoke and flare beacons, cable cutters, cable disconnectors for generators, ejection mechanisms, etc.

One conventional form of electroexplosive device employs a resistive bridge wire, which is composed of a fine metal wire connected between a pair of terminals and adapted to be energized from a source for electrical energy through the terminals.

This resistive element is imbedded in a quantity of heat sensitive primer explosive material such as lead styphnate. Adjacent to the primer material is the base charge which may be a high explosive such as pentaerythritol tetranitrate (PETN) or trimethylene trinitramine (RDX), etc. The application of an electric current through the bridge wire causes it to heat up by virtue of the high electrical resistance of the small cross sectional area. The high temperature sets off the sensitive primer which in turn detonates the high explosive.

One disadvantage of an electroexplosive device of this type is the danger that currents induced by stray radio frequency electromagnetic waves will heat the bridge wire sufficiently to initiate the charge.

Inadvertent firing can occur not only from induced current across the conductive bridge wire but also from sparks between case and pins, etc. Elimination of induced current is difficult because components of the system (e.g., ground wire or coils) may act as receiving antennas.

In an effort to minimize the possibility of inadvertent firing, Government specifications have been issued for certain special classes of initiators which prescribe that the device be capable of carrying a one ampere current, or handle a power input of one watt, whichever is greater, without causing the initiator to attain a temperature sufficiently high to explode the primary charge. Despite the "no-fire" power input criterion, the device must meet a low power "all-fire" specification.

In the terminology of explosive components, the term "all-fire" is defined as the minimum current that will always fire the device.

"No-fire" is the maximum current that may be applied for a given time without firing the device.

Briefly stated, the initiator of this invention comprises a conductive plastic resistance element, bonded to, preferably by comolding and supported throughout its length by an integrally bonded electrically nonconductive, but thermally conductive, plastic base which serves both as a support and as a heat sink. Provision is made for a large heat exchange area relative to the mass.

The immediate advantages of this construction are two-fold. First, the intimate thermal contact between the conductor and its supporting base provides a heat sink to accept moderate amounts of energy released in the conductor. Second, the fact that the conductive plastics are made with specific resistivities (0.05 ohm-centimeter and greater) which is many times the specific resistivities of metals used in wire or of graphite film type initiators permits the use of initiator elements with cross sections many times greater than wires of the same ohmic resistance. Therefore, the energy released by stray R.F. current is distributed over a high heat transfer area relative to the element mass. Unwanted temperature buildup is prevented.

Employment of electrically conductive plastics for the conductor confers a still further advantage in flexibility of choice of the resistance of the conductor and accurate control of resistance value.

The most usual range of resistance values selected for initiators is 0.2 to 10 ohms. In some instances as for example the so-called one ampere-one watt type the maximum resistance may be but 1.5 ohms. However, inasmuch as conductive plastics can be readily provided with such widely divergent resistivities as 0.05 to 200 ohm-centimeters, it will be apparent that conductors can be designed with resistances considerably larger or smaller than usual values should detonation circuit designs require them, without departing from the advantages above described.

Likewise, dimensions can be varied without alteration of resistance value to change the thermal characteristics of the element. It is preferred, however, that the thickness of conductor not be reduced below 0.0002″.

As regards the aforementioned advantage of flexibility of resistance value and control of resistance, it should be noted that thin wires and graphite films are limited as to possible dimensions associated with a chosen resistance value by the intrinsic fixed resistivity of the metal in question or of graphite. The exceedingly fine wires required in initiators of the wire type are often manufactured by corrosion processes applied to wires of larger original diameter. The process results in somewhat nonuniform corrosion which, in exceedingly fine wires, means significant variations in cross section. It is suspected that certain failures of wire type initiators are due to overheating in local areas of high resistance. Similarly, graphite films must be laid down in thin films because of their physical character. At any rate, with wires and films severe problems of achieving uniformity and reliability exist.

By contrast with the above, accurate control of the resistivity of electrically conductive plastics is a well established art. Furthermore, the use of conductors of relatively large cross-section, as in the present invention, means that the uniformity of these dimensions can be controlled with great accuracy by the processes here described.

A still further advantage of the relatively large dimensions of the conductor is unequivocal and reliable contact with the surrounding explosive.

An important advantage of the device of the present invention already mentioned in passing is greatly reduced susceptibility to accidental firing due to R.F. fields. Such fields may arise from nearby equipment as frequently happens in missile or rocket systems, from chance external source, or from incidence of radar or other beams of R.F. energy.

Exposure to such fields may actually cause the initiator to function inadvertently, or by heating, cause deterioration of the initiator itself, or the surrounding explosive.

The device of the present invention, by reason of its relatively large mass compared to fine wires or graphite films, and its intimate thermal contact with its insulator bases, is able to withstand the influence of currents induced by comparatively energetic R.F. fields without being activated or deteriorated. Nevertheless, the device can be reliably activated using the usual charged condenser as a source of triggering energy.

In connection with rockets, fuses carried by the rocket must withstand high accelerating forces without damage. As will be explained hereinafter, the device of this invention is well adapted for such service.

There are several types of initiators in current use, typical of which are the following:
 (a) Resistance wire,
 (b) Exploding bridgewire,
 (c) Spark-gap bridge,
 (d) Conductive explosive mix bridge.

The device of the present invention overcomes certain deficiencies of the aforementioned types, and additionally has a number of advantages detailed hereinafter.

The resistance wire device comprises an extremely fine filament stretched between terminal posts. The fire filament is fragile and subject to breakage in assembly and during the loading of the explosive which should be packed tightly against the initiator. The conductive plastic element of this invention is rigidly mounted on a supporting base and cannot be dislodged or broken during the explosive loading operation.

The exploding bridgewire and spark gap bridges require high power inputs which in turn necessitates large power supplies. In space vehicles, the size and weight of such power supplies can prevent their use. On the other hand the conductive plastic device of this invention can handle relatively large amounts of power without initiating detonation of the explosive and yet can be fired with a power input of the order of but 300 to 7,000 ergs.

The conductive explosive mix utilizes a mixture of metal or conductive carbon and explosive with or without resin binder. Such devices must be manufactured in special plants like any other explosive product. The present device can be made under ordinary nonhazardous conditions. In the conductive explosive mix any irregularity or locally concentrated current path is a potential explosion hazard from stray currents. The present invention does not rely on the presence of explosives in the resistive composition.

A particularly feature of the invention is the lower power requirement for firing the device.

These and other features, objects and advantages of the invention will, in part, be pointed out with particularity and will, in part, become obvious from the following more detailed description of the invention, taken in conjunction with the accompanying drawing, which forms an integral part thereof.

Figure 3:
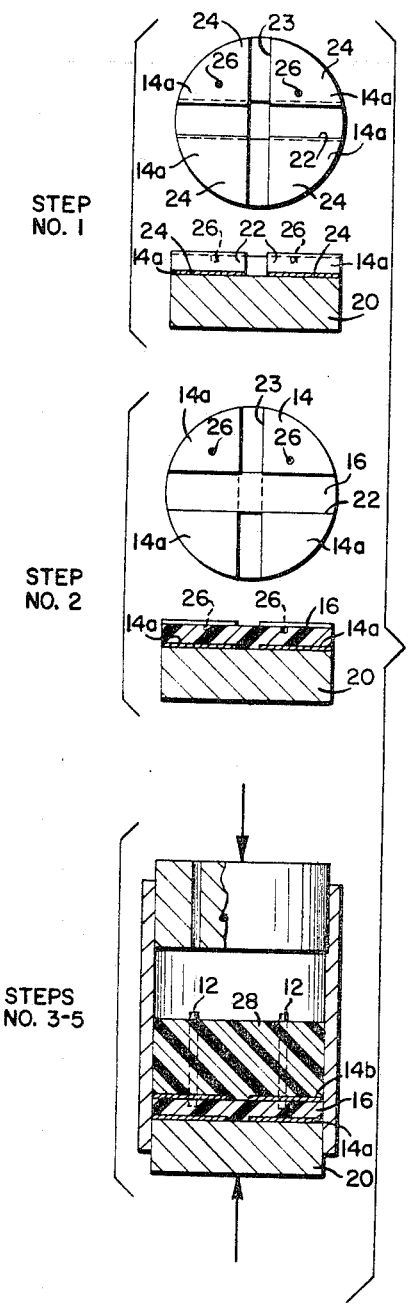

FIG. 3 discloses various stages of a molding process wherein:
 Step 1 is comprised of a plan view and a side elevational view partly broken away; and
 Step 2 is comprised of a plan view and a side elevational view partly broken away; and
 Step 3 is a side elevational view partly broken away.

Figure 4:
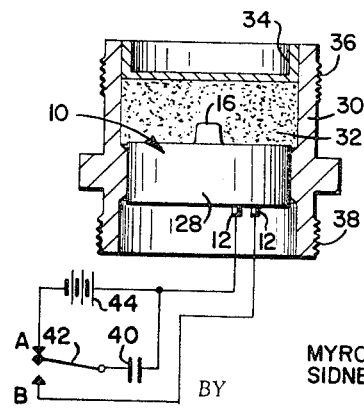

FIG. 4 is a vertical cross-section of a completely eletroexplosive device employing the electrical initiator plug of this invention.

Figure 5A:
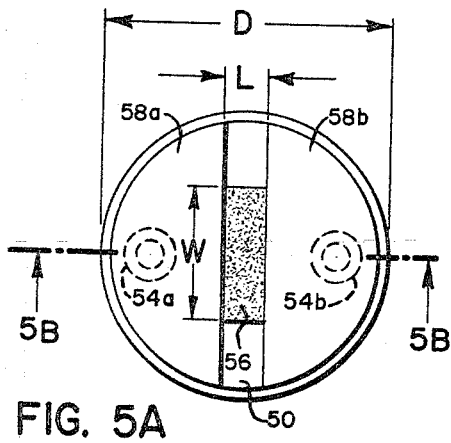

FIG. 5A is a plan view of an alternative bridged initiator plug construction.

Figure 5B:
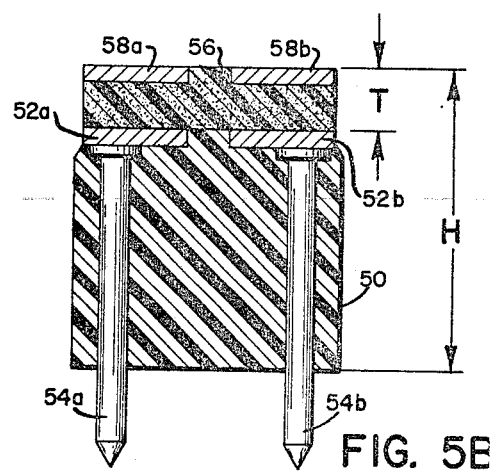

FIG. 5B is a section taken in elevation along lines 5B—5B of FIG. 5A.

Figure 6:
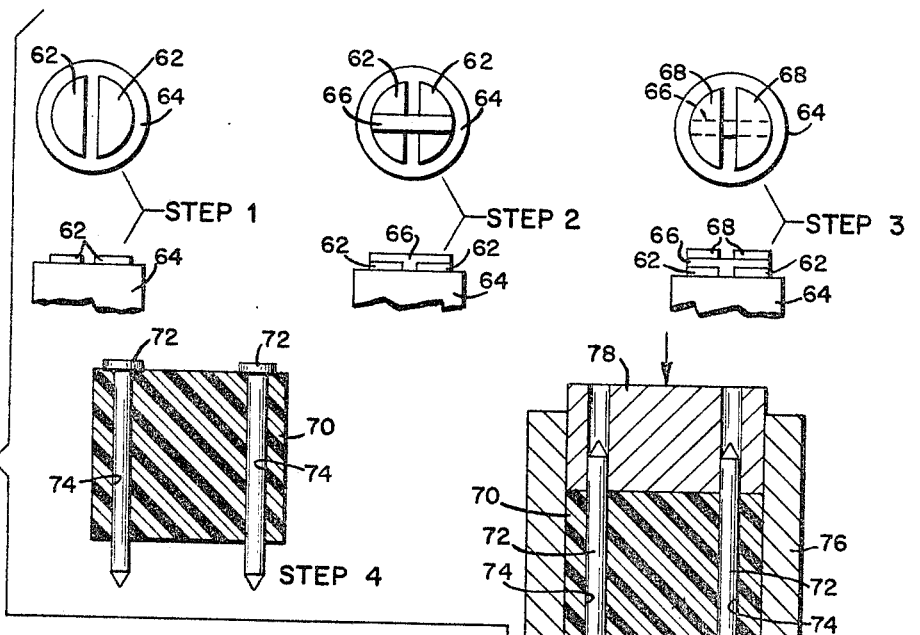

FIG. 6 discloses various stages of an alternative molding process wherein:
 Step 1 is comprised of a plan view and a partial elevational view of the mold force showing an electrically conductive coating applied thereto;
 Step 2 is comprised of a plan view and a partial elevational view of the mold force of Step 1 with a further deposit of conductive plastic;
 Step 3 is comprised of a plan view and a partial elevational view of the mold force of Steps 1 and 2 with a further deposit of an electrically conductive coating;
 Step 4 is a cross-section taken in elevation of a preform of compacted plastic molding powder showing terminal pin inserts;
 Step 5 is a cross-section taken in elevation of a mold assembly.

Figure 7:
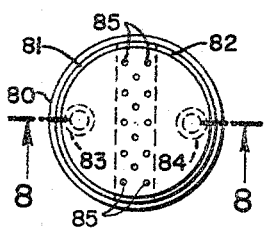

FIG. 7 is a plan view of an initiator device.

Figure 8:
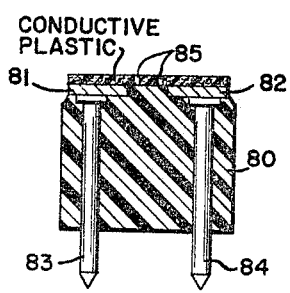

FIG. 8 is a section taken in elevation along line 8—8 of FIG. 7.

Figure 9:
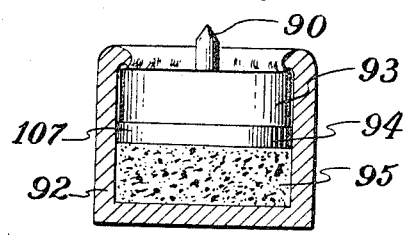

FIG. 9 is a view taken in elevation of a completed initiator plug with the housing shown broken away.

Figure 10:
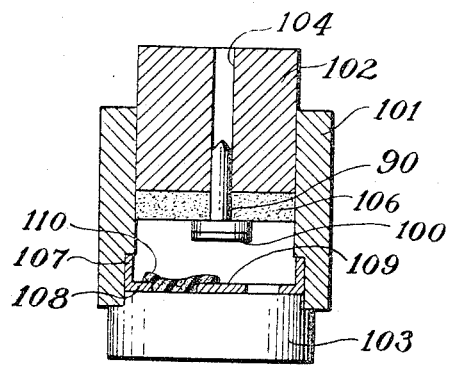

FIG. 10 is a cross-section taken in elevation, and prior to molding, of a mold loaded with components for making the plug of FIG. 9.

Figure 11:
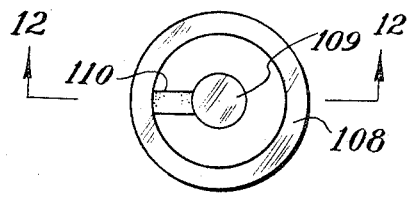

FIG. 11 is a plan view of a molded plug after removal from the mold shown in FIG. 10.

Figure 12:
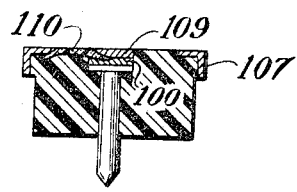

FIG. 12 is a sectional view taken along line 12—12 of FIG. 11.

Figure 13:
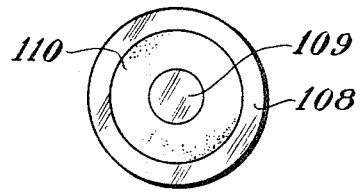

FIG. 13 is a plan view of the device similar to FIG. 11 showing a different conductive plastic configuration.

Figure 14:
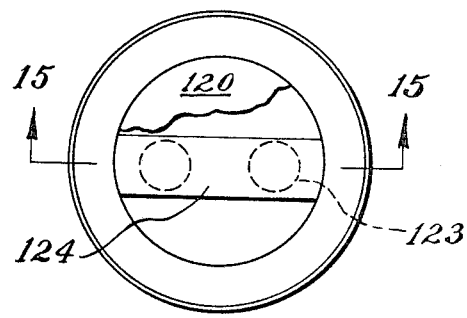
Figure 15:
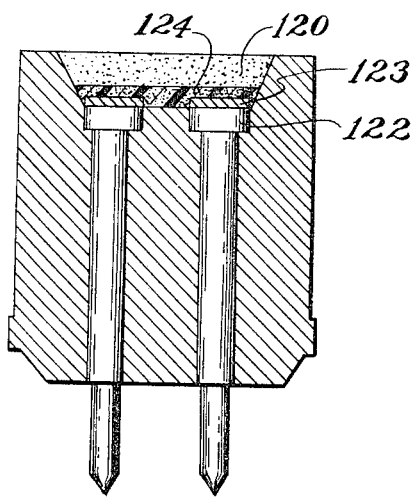

FIG. 14 is a plan view of an alternative electrical initiator plug of this invention with portions broken away; and FIG. 15 is a section taken in elevation along line 15—15 of FIG. 14.

Figure 1:
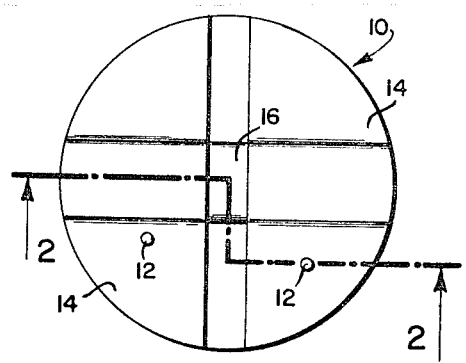
FIG. 1 is a plan view of the electrical initiator plug of this invention.
Figure 2:
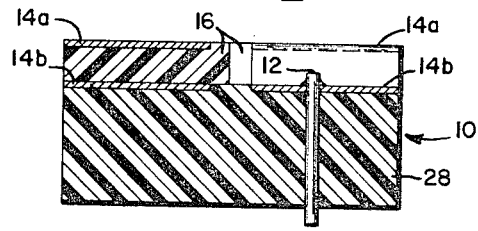
FIG. 2 is an elevation view, partly in section, of the electrical initiator plug of this invention.

Referring now to FIGS. 1 and 2, there is shown a supporting insulator plastic base 10, provided with conductive leads 12 extending through the insulator base and making connection with silver terminal members 14. Extending between the terminal members 14 and in electrical contact therewith is a conductive plastic member 16 having a resistance in the range of 0.2 to 10 ohms. The plastic base 10 has a diameter of about ¼″ and the conductive plastic member 16 is from 0.030″ to 0.060″ in width and about 0.020″ to 0.030″ deep.

The device may be made as follows:

STEP 1

A simple cylindrical mold member 20 is employed for molding the supporting base 10. Member 20 is conveniently formed out of ¼ inch pin stock, and is provided with a radial groove 22 extending across the face. A slurry of finely divided silver, preferably in flake form, with a minor proportion of binder, is then applied to form a silver coating 14a on areas 24 and 24', each area including a portion of the groove 22, but separated from each other by a gap 23 which is from 0.02 inch to 0.100 inch wide.

STEP 2

The groove is now filled with a conductive plastic 16 of the common dispersion type or the type disclosed in U.S. Patents Nos. 2,761,854 and 2,683,699 thereby filling the groove including the portion which is silver coated. The conductive plastic, after molding, should have a resistivity greater than 0.05 ohm-centimeter and preferably between 0.1 and 2.0 ohm-centimeter.

Conductive plastics of the thermoset type, such as those based on phenolic resins, are particularly useful as being dimensionally stable to moderate heating as may occur during assembly of the initiator.

STEP 3

A second layer 14b of silver is now applied over coating 14a and allowed to extend onto the ends of the conductive plastic member 16.

STEP 4

Leads 12 are now inserted in holes 26 and insulator molding powder 28 added.

STEP 5

The assembly is now comolded under suitable conditions of heat and pressure to provide flow of the plastic. Leads 12 are now soldered to the silvered layers 14. In lieu of soldering, other conventional contact making means may be employed.

It will be appreciated that the particular procedure and construction just described provides a highly conductive terminal which completely surrounds the end of the conductor. The arrangement is not essential to the functioning of the device but it is considered a material improvement in that current is allowed to enter the conductor on all sides. Local areas of high current flow which might induce local overheating at points of comparatively high resistance near small terminals are avoided.

Referring now to FIG. 4, where there is shown an enlarged cross-sectional view of a complete electroexplosive device, the insulator plastic base is secured within a shell 30 with the conductive plastic initiator 16 disposed in a mass of high explosive 32. The explosive is retained within the shell 30 by means of a cap member 34. The shell 30 is provided with conventional thread means 36 and 38. Thread means 36 is used to secure the detonator in a casing containing a device to be explosively actuated. Thread 38 is used to secure the shell of an electrical connector having an insert adapted to mate with terminals 12.

For the purposes of illustrating the preferred method of electrical ignition, the schematic wiring diagram of FIG. 4 shows a condenser 40 connected to the lead in wires 12 through a switch 42 which in a position A connects the condenser 40 to a source of voltage shown here by way of example by the battery 44 and in position B discharges the condenser 40 across the terminals of the lead in wires 12. The condenser discharge type of ignition is merely a preferred way insofar as it is well suited for exact timing. The high voltage source may be connected directly across the fuse terminals and the voltage supply may be any suitable source as long as it has the necessary voltage and current capacity.

Alternative methods for making the device of the present invention exist. Thus, for instance, the conductor may be prepared as a small bar-shaped preform or molding about which the remaining insulator plastic of the initiator base is molded or cast. The preform may or may not have conductive terminations applied before the second molding operation. In either event contact may be made with the ends of the bar by conventional means.

Again the initiator base may be preformed or molded with a groove in one flat face having the dimensions of the desired resistor. Silver slurry may be applied to the base in substantially the pattern described in the foregoing example. The conductor is then molded or cast into the groove.

Still another procedure is to prepare an insulator plastic base, with or without a groove, to receive the conductive plastic insulator; then to apply and cure a silver lacquer in substantially the pattern previously described; next, to apply to the base through a suitable mask a sufficient number of layers of conductive paint having the desired resistivity when dried and cured to build up the requisite thickness of material (drying each layer as needed before the next application); finally, preferably to apply a second layer of silver lacquer in the terminal areas and cure the same.

This last mentioned procedure, while producing a usable initiator is less favored than actual molding operations as providing less intimate and reliable bonding between the elements of the structure.

Still other alternate construction procedures will occur to those skilled in the handling of conductive plastics.

Units made according to the instant invention have successfully and consistently withstood the dissipation of at least 4.4 watts for ten seconds without exploding or deteriorating the charge of lead styphnate. Such a current affords a generous margin of safety for continuity tests with any reasonable current in an installed initiator and represent a very considerable resistance to stray currents or beams of R.F. energy.

It has been found that change in resistance of the conductor is a more sensitive indicator of overheating or impending deterioration of an initiator than visual observation of heat or other nonnumerical observation. A number of units having conductors 0.020" long, 0.060" wide and 0.030" deep were tested with currents of one ampere. Results were as follows:

| Initiator No. | Resistance, ohms | Time, sec. | Change in resistance |
| --- | --- | --- | --- |
| 22 | 0.7 | 10 | 0 |
| 23 | 1.0 | 10 | 0 |
| 24 | 1.1 | 10 | 0 |
| 25 | 0.8 | 15 | 0 |
| 26 | 0.9 | 10 | 0 |
| 27 | 0.8 | 15 | 0 |

After the above tests, the initiators still fired when exposed to condenser discharge as earlier described.

It will be appreciated that the possibility of arranging the conductor so as to project into the surrounding explosives as in the detail example herein or so as to be embedded in the insulator base with one face exposed as in certain of the described alternate procedures provides a means to adjust with relative ease the rate of heat transfer between conductor and base, and conductor and explosive, as may be required in any particular initiator design.

A currently preferred initiator element of this invention is shown in FIG. 5. This element may be used in a complete device of the type shown in FIG. 4. An electrically nonconductive but thermally conductive base member 50 is provided with a pair of spaced wide area, highly conductive contact surface 52a, 52b which are bonded to terminal pins 54a, 54b, respectively. A conductive plastic resistance element 56 extends across a portion of the gap. Optionally, layers of silver 58a and 58b are deposited over the top of the resistance element 56.

Typical dimensions for the element are as follows:

D=0.25 in. dia.
W=0.050 to 0.250 in.

T=0.0028 to .010 in.
H=0.28 in.
L=0.030 to 0.060 in.
$e = 1 \times 10^{-4}$ to $1 \times 10^{-1}$ ohm-centimeters Resistive element dimensions are determined by several requirements. The rate at which heat is generated in the element by the passage of current under no-fire conditions (e.g., the one watt military requirement) determines the length L and the width W. The area, $L \cdot W$, must be large enough to transfer this heat at such a rate that the temperature does not exceed the deterioration or explosion temperature of the primer. In other words, the rates of generation and transfer of energy must be equal at a temperature lower than the said deterioration or explosion temperature.

The thickness is determined by the desired resistance of the element and the specific resistivity of the conductive plastic use. Resistance may be calculated from the well known expression $$R = \frac{\rho l}{A}$$

Further dimensions must be so selected that the element will be heated so as to detonate the primer when the desired amount of energy is put into the initiator from a condenser discharge. It is a surprising and advantageous property of the conductive plastics that such temperatures are reached when less energy is suddenly released in it, as from a condenser discharge than would be required to heat its entire mass to the same temperature.

It will be seen from the above that a particular advantage of the use of conductive plastics lies in their availability over a wide range of specific resistivities so that dimensions and resistivity can be readily suited to a particular problem.

A thermally conductive electrically nonconductive plastic is essential for the operation of the initiator in the 1 amp-1 watt range. For other types of initiators, insulating plastics of ordinary thermal properties compatible with the conductive plastic can be used.

Preferred types of thermally conductive plastic are 25% diallyl isopthalate prepolymer-peroxide catalyzed, spray dried and pulverized with 75% oxidized aluminum powder for application not requiring resistance to high voltage, and 25% of the same resin with 75% boron nitride for applications requiring resistance to high voltage. Increased thermal conductivity with some reduction in molding properties and final strength were achieved with up to 90% oxidized aluminum powder and boron nitride. Conversely, insulators with 10% of the conductive material yielded insulators having poor thermal conductivity. At least 50% by weight of the thermally conductive material should be used so as to provide significant thermal conductivity in excess of a corresponding unmodified resin.

Suitable thermal conductivity additives are those which are compatible with resin, are chemically stable under the conditions of use, have an electrical resistivity of about $10^{10}$ ohm-cm. or higher and a thermal conductivity of 0.03 cal./cm./° C./sec. or greater. Boron nitride, beryllium oxide and metals having electrically insulating coatings may be employed. While the beryllium oxide has the desired thermal properties, its use is limited by its poisonous character.

The degree of thermal conductivity which would be used would depend on the geometry of the unit, the nature of the metal or plastic casing and most especially the size, shape and material of the metal terminal, e.g., silver terminals give by far the best heat conduction, but brass terminals are harder and therefore more desirable for most applications. Silver plated brass is a suitable material.

The insulator binder is chosen to be comoldable to the conductive plastic used for the resistance elements. If the conductive plastic is phenolic based then a phenolic type insulator resin should be employed.

Other suitable resins for use in the conductive plastic and electrical insulator plastics are:

Thermosetting resins—
    Phenolics
    Alkyds
    Epoxy (high heat distortion types)
    Silicons
    Polyurethane
Thermoplastic resins—
    Tetrafluoroethane polymers, such as Teflon and Halon
    Copolymer of above with hexafluoropropylene (Teflon TFE)
    Polyamides (nylon)
    Polyacetals (Delrin)
    Polycarbonates (Lexan)
    Polychlorotrifluoroethane (Kel-F)
Polyaromatic systems—
    Polyamides (Du Pont "H"), (Monsanto Skyguard 700)
    Polyamide-amides (Amoco AI-10)
Polybenzimide—azole (Narmco Imidite)

The decomposition temperature of the resin should not be less than the ignition temperature of the primary explosives. Nor should the polymer show any reactivity with the explosive used. We would not recommend, for example, epoxies catalyzed with amine.

The method of making the element is shown in FIG. 6.

Step 1.—A layer of silver powder 62, about 0.005 in. thick is applied to the face of a mold force 64 through a suitable mask to provide a pattern as shown.

Step 2.—A layer of conductive plastic 66 is applied through a mask across the spaced silver regions.

Step 3 (optional).—A second layer of silver 68 is applied in the same pattern as layer 62.

Step 4.—A preform of thermally conductive electrically nonconductive plastic is made by simple compression of molding powder to the point where a cohesive compact 70 is formed. Terminals 72 are inserted in holes 74 provided in the body.

Step 5.—The coated force from Step 3 is inserted in collar 76, the compact of Step 4 inserted, and an upper mold force 78 added to the assembly. Sufficient heat and pressure for the molding resins employed are used to mold the element.

Typical examples of devices using an electrical insulation plastic containing 75% by weight of boron nitride follow:

Example

Parameters of resistive path:
    $L = 33 \times 10^{-3}$ in.
    W=0.24 in.
    $T = 2.6 \times 10^{-3}$ in.
    $\rho = 2. \times 10^{-2}$ ohm in.

No-fire test—
    Explosive—lead styphnate
    Current 1 amp passed = 1 watt for 15 minutes
    Contact area = $8 \times 10^{-3}$ sq. in.
    Power dissipation = 125 watts/sq. in.
    Result—Explosive not detonated All-fire test—
    Discharge of a 22 µf. condenser charged to 200 volts
    Energy input = $4.4 \times 10^6$ ergs
    Result—Explosive detonated Example Parameters of resistive path:
    L=0.034 in.
    W=0.016 in.
    T=0.005 in.

$\rho = 2.4 \times 10^{-4}$ ohm-in.
$R = 1$ ohm

No-fire test—
  Explosive—lead styphnate
  Current 1 amp-1 watt for 5 minutes
  Area = $55 \times 10^{-5}$ sq. in.
  Result—Explosive did not detonate All-fire test—
  A 1 µf. condenser charged to 67 volts was discharged into the device
  Energy input—22,500 ergs
  Result—Explosive detonated In FIGS. 7 and 8 there is disclosed an embodiment particularly suited for devices meeting low all-fire energy requirements. Such devices require small, light and generally simple power supplies. There is a great need for such devices which will operate reliably with power inputs of less than 40,000 ergs and preferably about 10,000 ergs. It should be recognized that such low all-fire requirement is at variance with the no-fire concept. For some critical application there is a no-fire requirement that the device handle 1 watt of power for a five minute period without a rise in temperature in excess of 190° C. This provides a substantial safety factor when an initiator explosive is used, such as lead styphnate, which requires a temperature of 282° C. for explosion. The special device is comprised of a thermally conductive, electrically nonconductive filled plastic base 80 provided with metal contact areas 81 and 82 bonded to terminal pins 83 and 84. This may be done by following the procedures set forth in FIG. 6, temporarily omitting Steps 2 and 3. Then the resulting molded base is coated with conductive plastic through a silk screen to provide a pattern interrupted by holes 85. This corresponds to Step 2 of FIG. 6. The conductive plastic may be applied by any of the known methods from a dispersion. Conductive plastic dispersions may be readily prepared by methods well known to the art. At this point an additional layer of silver may be added as in Step 3 of FIG. 6. This layer is optional.

This additional layer is preferably added after the conductive plastic layer has had an opportunity to evolve volatile solvents. If the conductive plastic resin forms a tight bond with plastic base member molding Step 5 of FIG. 6 may be dispensed with.

The preferred procedure is to comold the structure to provide maximum heat transfer from the initiator element to the base and then to the case and terminals for ultimate discharge to the equipment in which it is installed.

The configuration of FIGS. 7 and 8 employs an element in the range between 0.0002 and 0.0020 in. thick and which is spread out over a large area for effective heat dissipation. The openings permit the maintaining of a desired ohmic resistance from terminal to terminal without making the element so thin that reproducibility and reliability becomes problematical.

While the element is shown having round holes, other shapes may be provided. In fact, parallel rectangular or even superfine slots may be provided so that in effect a multiplicity of parallel thin conductive strips result extending from terminal to terminal.

In one device there was employed a conductive plastic comprising:

| | Parts by weight |
|---|---|
| Diallyl isophthalate resin | 1 |
| Silver powder | 2 |
| Acetylene black | 1 |

The resin was laid down in the pattern shown in FIG. 7, having the following dimensions:

$T = 0.5 \times 10^{-3}$ in.  $L = 0.043$ in.
$W = 0.24$ in.  $R = 0.4$ ohm
Holes 34 at 0.01 in. dia.

Calculations show that 2,400 ergs would raise the temperature of this mass of conductive plastic 1° C. In one test 22,000 ergs were put into the conductive plastic by means of a capacitor discharge. While this should have resulted in a mere 9.2° rise in temperature, it was found that a complete breakdown of the resin occurred along a line transverse to the direction of current flow. Since the resin used requires a temperature in excess of 400° C. for decomposition, it will be appreciated that the temperature present was indeed sufficient to detonate an explosive such as lead styphnate which has an explosion temperature of 282° C. Actual tests with lead styphnate (explosive temperature 282° C.) gave firing at 20–40 microseconds with an energy input of 7,000 ergs from a condenser discharge. These same units did not fire when 4.4 watts were applied for five minutes.

This extremely low energy requirement for firing is surprising in view of the energy requirements of other systems.

When a particularly small initiator plug is required, the embodiment of FIG. 9 is preferred. This embodiment can be made with a diameter in the order of but 0.08 inch. A single electrical lead 90 is employed as one terminal in conjunction with a metal case 92 which serves as the other terminal. The firing voltage is applied between lead 90 and case 92. The metal case is crimped over the edge of insulator plastic base 93. An electrically conductive, inherently nonexplosive plastic member 94 is in contact with a packed, heat-sensitive explosive charge 95.

The plug is molded in the mold assembly shown in FIG. 10. The assembly comprises an outer sleeve 101, upper force 102, and a lower force 103. Force 102 is provided with a central bore 104 in which there is positioned the shaft of a contact pin 90. The head of the pin is coated with silver powder 100. A coating of silver powder is also applied in a ring pattern 107 around the inner wall of the mold sleeve 101, as an annular ring 108 and as a center circle 109 on lower mold force 103. A conductive plastic strip is coated over portions of ring 108 and center contact 109 forming a bridge therebetween. The configuration of this conductive plastic bridge is shown in FIG. 11. If desired the conductive plastic coating may extend completely across the contacts, as shown in FIG. 13. Other conductive plastic bridge configurations may likewise be employed to provide desired resistance characteristics.

After the conductive plastic is applied, an insulator plastic preform 106 is loaded into the mold together with coated contact pin 90, the mold assembled and molding completed under conditions of temperature and pressure suitable for the synthetic resin employed. It will be noted that the mold sleeve configuration is such that the electrically conductive metal portion 107 extends out from the wall of the unit, as may be seen, for example, in FIGS. 9 and 12. This provides good mechanical and electrical connection between the wall of casing 92 and the conductive metal portion.

The conductive plastic layer 110 is sandwiched between metal layers 100 and 109 and then molded. This provides extremely good contact. The resulting sandwich of layers may be seen in FIG. 12. It should be appreciated that for purposes of clarity, the thickness of the layers has been grossly exaggerated.

In FIGS. 14 and 15 there is shown another embodiment which is made in accordance with the procedures of say, FIG. 6. However, the mold force is provided with means to form a cup 120 at the top of the insulator plastic body 121. Contact pins 122 are molded into the body. Metal powder is applied to the heads of the pins to form conductive areas 123 and a conductive plastic bridge 124 placed between the contact areas 123. Within the cup thus formed there is placed the explosive. This structure has many advantages; for example, manufacturing procedures are simplified with a resultant reduction in cost and a leak-free structure is provided which is side sealed at the critical junction between the explosive material and the conductive plastic bridge interface. This construction therefore provides greater protection against moisture interference at the interface. It further provides a method for automatically metering the quantity of the explosive employed. Only a simple outer protective sleeve is required to complete the assembly.

The term "highly conductive leads," as used herein, is intended to encompass leads of negligible resistance compared to the resistance of the fuse. Thus a copper hookup wire, as conventionally employed in electronic devices, is regarded as being a highly conductive lead.

There has been disclosed heretofore the best embodiment of the invention presently contemplated and it is to be understood that various changes and modifications may be made by those skilled in the art without departing from the spirit of the invention.

What we claim as new and desire to secure by Letters Patent is:

1. An electrical initiator plug for an electroexplosive device having a casing containing a heat-sensitive detonating charge, said initiator plug comprising:
   (a) An electrically nonconductive base member, composed of an electrically nonconductive plastic composition with enhanced thermal conductivity, said plastic composition containing at least 50% by weight of a relatively highly thermally conductive filler dispersed therein, said filler having an electrical resistivity of at least $1 \times 10^{10}$ ohm-cm. and a thermal conductivity of at least 0.03 cal./cm./° C./sec., said base member mounted in said casing a first face of which is mounted proximate the heat-sensitive charge;
   (b) At least two spaced, electrically conductive contact members intimately contacting said first face; and
   (c) An electrically conductive inherently nonexplosive plastic member extending between said electrically conductive members in intimate contact with said first face and the heat-sensitive charge.

2. An electrical initiator plug for an electroexplosive device having a casing containing a heat-sensitive charge, said initiator plug comprising:
   (a) An electrically nonconductive base member, composed of an electrically nonconductive plastic composition with enhanced thermal conductivity, said plastic composition containing at least 50% by weight of a relatively highly thermally conductive filler dispersed therein, said filler selected from the group consisting of boron nitride, aluminum oxide and beryllium oxide, said base mounted in said casing a first face of which is mounted proximate the heat-sensitive charge;
   (b) At least two spaced electrically conductive contact members intimately contacting said first face; and
   (c) An electrically conductive inherently nonexplosive plastic member extending between said electrically conductive members in intimate contact with said first face and the heat-sensitive charge.

3. An electrical initiator plug for an electroexplosive device having a casing containing a heat-sensitive charge, said initiator plug comprising:
   (a) An electrically nonconductive base member, composed of an electrically nonconductive plastic composition with enhanced thermal conductivity, said plastic composition containing at least 50% by weight of a relatively high thermally conductive filler dispersed therein, said filler consisting of particles having electrically insulating coatings, said base member mounted in said casing a first face of which is mounted proximate the heat-sensitive charge;
   (b) At least two spaced, electrically conductive contact members intimately contacting said first face; and
   (c) An electrically conductive inherently nonexplosive plastic member extending between said electrically conductive members in intimate contact with said first face and the heat-sensitive charge.

4. An electrical initiator plug for an electroexplosive device having a casing containing a heat-sensitive charge, said initiator plug comprising:
   (a) An electrically nonconductive base member mounted in said casing, a first face of which is mounted proximate the heat-sensitive charge;
   (b) At least two spaced electrically conductive contact members intimately contacting said first face, and including a terminal member in electrical and mechanical connection with each of said electrically conductive contact members, said terminal members extending through the body of the base member and having an exposed portion for the making of electrical connection to external circuits; and
   (c) An electrically conductive low resistance and inherently nonexplosive, nonmagnetic, nonferrous and moldable plastic member extending between said electrically conductive members in intimate contact with said first face and with said heat-sensitive charge.

5. An electrical initiator plug for an electroexplosive device having a casing containing a heat-sensitive charge, said initiator plug comprising:
   (a) An electrically nonconductive base member mounted in said casing a first face of which is mounted proximate the heat-sensitive charge;
   (b) At least two spaced electrically conductive contact members intimately contacting said first face, and including a terminal member in electrical and mechanical connection with each of the said electrically conductive contact members, said terminal members extending through the body of the base member and having an exposed portion for the making of eletrical connection to external circuits; and
   (c) An electrically conductive inherently nonexplosive plastic member extending between said electrically conductive members in intimate contact with said first face and the heat-sensitive charge, and said electrically conductive member containing a plurality of openings and being electrically continuous between said contact members.

6. An electrical initiator plug for an electroexplosive device having a casing containing a heat-sensitive charge, said initiator plug comprising:
   (a) An electrically nonconductive base member mounted in said casing a first face of which is mounted proximate the heat-sensitive charge;
   (b) At least two spaced electrically conductive contact members intimately contacting said first face, and including a terminal member in electrical and mechanical connection with each of the said electrically conductive contact members, said terminal members extending through the body of the base member and having an exposed portion for the making of electrical connection to external circuits; and
   (c) An electrically conductive inherently nonexplosive plastic member extending between said electrically conductive members in intimate contact with said first face and the heat-sensitive detonating charge, the said conductive plastic member being distributed over a surface area of said base member which is greater than the actual area of said conductive plastic member.

7. An electrical initiator plug for an electroexplosive device having a casing containing a heat-sensitive charge, said initiator plug comprising:
   (a) An electrically nonconductive base member mounted in said casing a first face of which is mounted proximate the heat-sensitive charge;
   (b) At least two spaced, electrically conductive contact members intimately contacting said first face; and
   (c) An electrically conductive inherently nonexplosive plastic member extending between said electrically conductive members in intimate contact with said first face and the heat-sensitive detonating charge, the said electrically conductive plastic member having a thickness substantially less than said width and extending over said contact members, said conductive plastic member being discontinuous in a plurality of planes transverse to a line extending between said contact members.

8. An electrical initiator plug for an electroexplosive device having a casing containing a heat-sensitive charge, said initiator plug comprising:
 (a) An electrically nonconductive base member mounted in said casing a first face of which is mounted proximate the heat-sensitive charge;
 (b) At least two spaced, electrically conductive contact members intimately contacting said first face; and
 (c) An electrically conductive inherently nonexplosive plastic member extending between said electrically conductive members in intimate contact with said first face and the heat sensitive charge, said electrically conductive plastic member having a thickness substantially less than said width and extending over said contact members, said member being between 0.002″ and 0.0020″ thick and having a resistivity in the range of $1 \times 10^{-4}$ to $1 \times 10^{-1}$ ohm-cm.

References Cited

UNITED STATES PATENTS

| | | | |
|---|---|---|---|
| 2,821,139 | 1/1958 | Apstein et al. | 102—28 X |
| 2,942,546 | 6/1960 | Liebhafsky et al. | 102—28 |
| 3,056,350 | 10/1962 | Lindblad | 102—28 |

SAMUEL FEINBERG, *Primary Examiner.*

VERLIN R. PENDEGRASS, *Assistant Examiner.*